(12) United States Patent
Gamper

(10) Patent No.: US 11,799,359 B2
(45) Date of Patent: Oct. 24, 2023

(54) SYSTEM FOR GENERATING ELECTRICAL ENERGY

(71) Applicant: WA.ST Srls, Laces (IT)

(72) Inventor: Karl Gamper, Laces (IT)

(73) Assignee: WA.ST Srls, Laces (IT)

( * ) Notice: Subject to any disclaimer, the term of this patent is extended or adjusted under 35 U.S.C. 154(b) by 240 days.

(21) Appl. No.: 17/442,527

(22) PCT Filed: Mar. 24, 2020

(86) PCT No.: PCT/IT2020/050073
§ 371 (c)(1),
(2) Date: Sep. 23, 2021

(87) PCT Pub. No.: WO2020/194362
PCT Pub. Date: Oct. 1, 2020

(65) Prior Publication Data
US 2022/0173635 A1    Jun. 2, 2022

(30) Foreign Application Priority Data

Mar. 27, 2019  (IT) ......................... 102019000004563

(51) Int. Cl.
| | |
|---|---|
| *H02K 7/18* | (2006.01) |
| *F03B 17/06* | (2006.01) |
| *H02K 7/06* | (2006.01) |
| *F03G 3/00* | (2006.01) |

(52) U.S. Cl.
CPC .......... *H02K 7/1876* (2013.01); *F03B 17/06* (2013.01); *F03G 3/00* (2013.01); *H02K 7/06* (2013.01)

(58) Field of Classification Search
CPC .......... H02K 7/1876; H02K 7/06; F03G 3/00
See application file for complete search history.

(56) References Cited

U.S. PATENT DOCUMENTS

| | | |
|---|---|---|
| 4,698,973 A | 10/1987 | Johnston |
| 8,169,091 B2 | 5/2012 | Powers |
| (Continued) | | |

FOREIGN PATENT DOCUMENTS

| | | | | |
|---|---|---|---|---|
| CA | 3135036 A1 | * | 10/2020 | ............. F03B 17/06 |
| CN | 113853727 A | * | 12/2021 | ............. F03B 17/06 |
| (Continued) | | | | |

*Primary Examiner* — Pedro J Cuevas
(74) *Attorney, Agent, or Firm* — Smartpat PLC

(57) ABSTRACT

A system for generating electricity includes a bar and a source of a pressurized fluid. A three-way connection piece has an inlet opening connected to the source through an inlet solenoid valve and a discharge opening connected to a discharge solenoid valve. A connection line connects the three-way connection piece to a working cylinder. A shaft of the working cylinder strikes against the bar causing an oscillating motion. A first and a second rod convert the oscillating motion into a back-and-forth translational motion which a drive means converts into a cyclical drive motion. An apparatus for generating electrical energy is driven by the cyclical drive motion. During operation, the inlet solenoid valve and the discharge solenoid valve are continuously switched from a first working position to a second working position, and vice versa, at a frequency which is identical to the natural frequency of the bar.

11 Claims, 9 Drawing Sheets

(56) References Cited

U.S. PATENT DOCUMENTS

| 8,456,029 B2* | 6/2013 | Powers | H02K 7/06 |
| | | | 290/1 R |
| 2011/0012443 A1* | 1/2011 | Powers | H02K 53/00 |
| | | | 310/36 |
| 2012/0189473 A1* | 7/2012 | Powers | H02K 7/06 |
| | | | 310/37 |
| 2019/0003448 A1 | 1/2019 | Shepsis et al. | |

FOREIGN PATENT DOCUMENTS

| DE | 102013210650 A1 | 12/2014 | |
| EP | 3949089 B1 * | 7/2022 | ............. F03B 17/06 |
| GB | 2391299 A | 2/2004 | |
| WO | WO-2020194362 A1 * | 10/2020 | ............. F03B 17/06 |

* cited by examiner

SYSTEM FOR GENERATING ELECTRICAL ENERGY

CROSS-REFERENCE TO RELATED APPLICATION

This application is a national stage application, filed under 35 U.S.C. § 371, of International Patent Application No. PCT/IT2020/050073, filed on 2020 Mar. 24, which claims the benefit of Italian Patent Application No. 102019000004563, filed 2019 Mar. 27.

TECHNICAL FIELD

The disclosure relates to a system for generating electrical energy wherein a bar fixed at one end is made to oscillate, and the oscillating movement of the bar is used to generate electrical energy.

BACKGROUND

The document US 2019/0003448 A1 describes a system for generating electrical energy in which the oscillation movements of sea waves are exploited to generate a mechanical movement to be transmitted to an alternator.

The document GB 2391299 A explains how to move a piston using hot water and use the movement of the piston to produce electrical energy using a linear generator.

SUMMARY

The disclosure relates to a system for generating electrical energy wherein a bar fixed at one end is made to oscillate, and the oscillating movement of the bar is used to generate electrical energy.

The above-mentioned bar fixed at one end forms a structure able to oscillate, which, subjected to a periodic stress, oscillates with a frequency and amplitude of the oscillations depending both on the frequency of the periodic stress and on the physical and geometrical characteristics of the bar.

Every structure able to oscillate also presents, as known, its own so-called natural frequency, which becomes of fundamental importance in the case in which the structure able to oscillate is stressed by a periodic force with a frequency that coincides with the natural frequency of the stressed structure. In this case the resonance phenomenon occurs, which, as known, causes a significant increase in the amplitude of the oscillations and this fact corresponds to a significant accumulation of energy within the stressed structure. In the case of excessive accumulation of energy, resonance can lead to physical collapse of the stressed structure, consequently, to preserve the physical integrity of the stressed structure, the occurrence of resonance is usually avoided, i.e., frequency values close to the natural frequency value are avoided.

Starting from this context, the task of the present invention is to provide a system for generating electrical energy that is able to exploit the resonance phenomenon to generate electrical energy.

According to the invention, the task is accomplished if a system for generating electrical energy has the characteristics as claimed.

The system makes it possible to generate, with a minimum consumption of energy, a periodic stress with which a bar, fixed at one end, is stressed, so that it oscillates. The frequency of the periodic stress with which the bar fixed at one end is stressed is equal to the natural frequency of the fixed bar, since the purpose of applying the periodic stress is precisely to bring the bar fixed at one end into the situation in which the resonance phenomenon occurs. In fact, contrary to what usually happens in the constructing technique, in the case of the invention it is desirable that the resonance occurs, since the system allows to control the phenomenon, by limiting the amplitude of the oscillations, and to extract the movement energy accumulating in the bar as a result of the increase in the amplitude of the oscillations caused by the resonance.

To make the bar fixed at one end oscillate, it is struck, with a frequency equal to the natural frequency of the bar, using, for example, at least one operating cylinder, whose stem is periodically driven by the thrust exerted on it by a pressurized fluid. The pressurized fluid is in turn made to flow, by suitable control of a pair of solenoid valves, periodically to the operating cylinder and precisely with a frequency equal to the natural frequency, so that in each second the bar is struck by the stem of the at least one operating cylinder a number of times that is equal to the natural frequency value of the bar.

Transformation and transmission means, as well as drive means, are foreseen to exploit the oscillating movement of the bar and generate electrical energy. The transformation and transmission means transform the oscillating movement of the bar into a back-and-forth translation movement and then transmit this back-and-forth translation movement to the drive means, which perform a cyclic drive movement as a result. With their cyclic drive movement, the drive means drive a device for generating electrical energy to which they are connected, so that the latter generates electrical energy. Two different technical solutions are foreseen depending on whether the device for generating electrical energy is an alternator (see claim 10) or a linear generator (see claim 11).

The operating cylinder is positioned in such a way (see claim 2), that the point of the bar where it is bumped by the stem of the operating cylinder is as close as possible to the fixed end of the bar. This minimizes the excursion of the stem when it is being extracted and therefore also minimizes the energy consumption required to extract the stem.

To optimize the system, may additionally be foreseen a device for measuring the amplitude and the frequency of the oscillations of the bar fixed at one end (see claim 5), so that the resonance phenomenon can be monitored, controlled and maintained over time, and a device for amplifying the pressure of the pressurized fluid (see claim 6). By means of the device for amplifying the pressure it is possible to vary, as required, the pressure value in the part of the system positioned downstream of such device with respect to the part of the system placed upstream of it. Thanks to this device, it is possible, for example, to design the part of the system upstream of the device taking into account a lower pressure value than that present in the part of the system downstream of the device, thus reducing costs.

The pressurized fluid is preferably running water from a normal feeding pipe of a waterworks. This is pressurized water available in large quantities everywhere. In this case, the at least one operating cylinder is a hydraulic operating cylinder (see claims 3 and 4).

By adding a further union, a pair of shutoff solenoid valves, a further operating cylinder and a further connection duct (see claim 7) is obtained a system that allows to reach more quickly the situation in which the resonance occurs in the bar. This further operating cylinder is in fact arranged further away from the fixed end of the bar than the at least one operating cylinder (see claim 8), so that the stem of this further operating cylinder strikes the bar at a point where the bar oscillates with a greater amplitude than the possible amplitude in the vicinity of the fixed end and this fact facilitates the achievement of the desired oscillation state.

Lastly, see claim 9, if are additionally foreseen a watertight receptacle, which is suitable to withstand external pressures higher than atmospheric pressure and is connected to the feeding duct, a tank connected to the exhaust duct and an electrical cable, which is connected to the alternator respectively to the linear generator and if all components of the system—with the exception of the feeding duct, the exhaust duct, the tank and the electrical cable—are arranged completely inside the receptacle, then the system may be immersed in the water of a lake or the sea, so that the pressurized water by means of which the stem of the at least one operating cylinder is driven respectively the stems of the least one operating cylinder and of the further operating cylinder are driven is the water of the lake or of the sea.

BRIEF DESCRIPTION OF THE DRAWINGS

Further advantages and features of the invention will appear more evident from the following description of examples of the system for generating electrical energy, illustrated purely by way of indicative and non-limiting examples, based on the appended drawings.

The drawings schematically show.

DETAILED DESCRIPTION

The figures show a system for generating electrical energy wherein a bar 1 fixed at one end is made to oscillate and the oscillating movement of the bar 1 is used to generate electrical energy. Such fixed bar 1 forms a structure which is suitable to oscillate and has its own specific natural frequency, which can be calculated in a known manner based on the physical and geometric characteristics of the bar 1.

Figure 1:
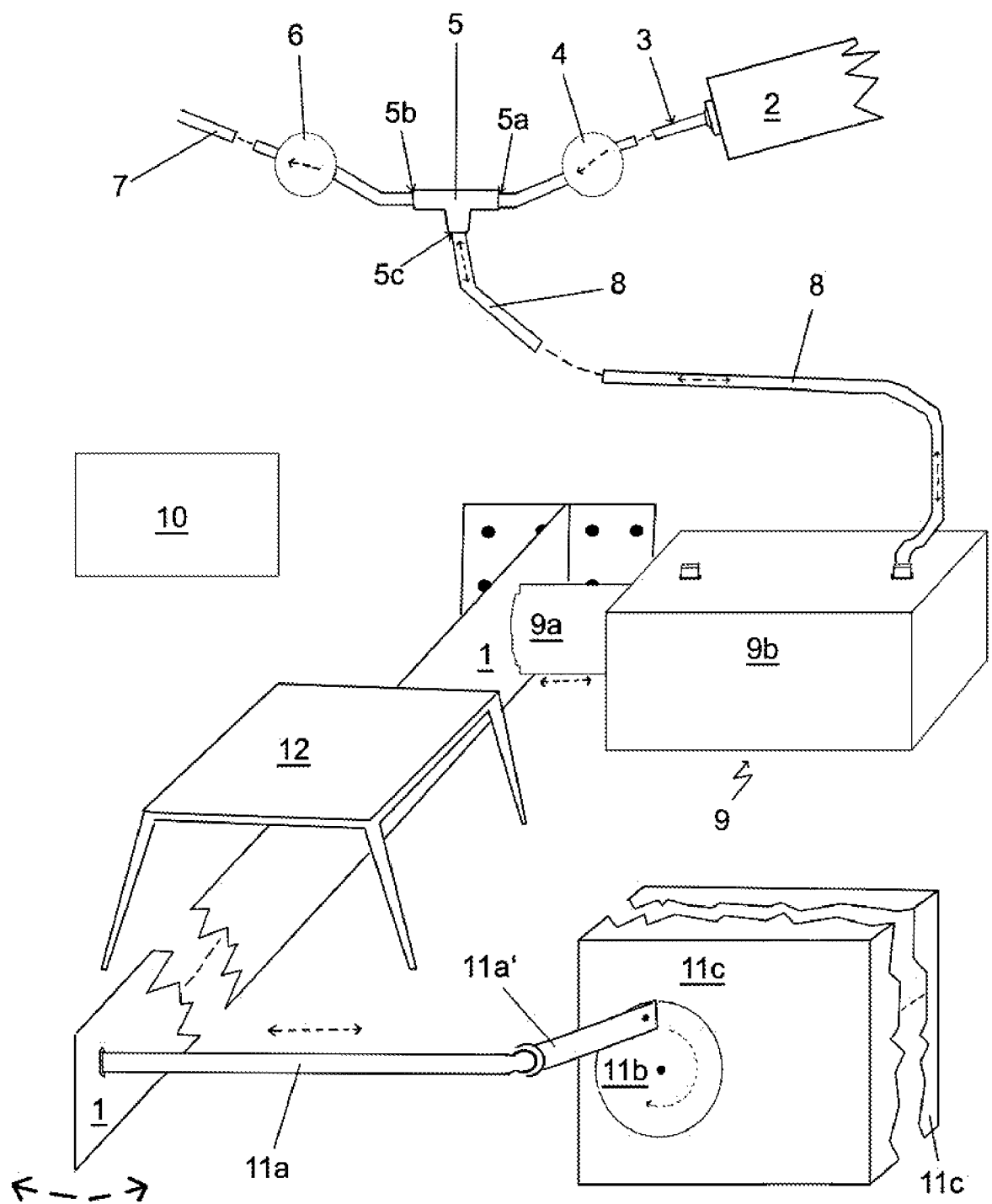
FIGS. 1-4 an overall, three-dimensional representation of, respectively, four examples of a first embodiment of the system, in which the device for generating electric energy consists of an alternator, the single components of the system not being, however, all represented in the same scale, for a clearer understanding thereof.

As shown, for example, in FIG. 1, the system comprises a source 2 of a pressurized fluid, a feeding duct 3 of the pressurized fluid, which 3 is connected to the source 2 of the pressurized fluid, and an inlet solenoid valve 4, the inlet opening of which is connected to the feeding duct 3.

The system further comprises a three-way union 5, an exhaust solenoid valve 6 and an exhaust duct 7.

The three-way union 5 has an inlet opening 5a, an outlet opening 5b and a connection opening 5c. According for example to FIG. 1, the inlet opening 5a of the three-way union 5 is connected by means of a first intermediate duct to the outlet opening of the inlet solenoid valve 4, while the outlet opening 5c of the three-way union 5 is connected by means of a second intermediate duct to the inlet opening of the exhaust solenoid valve 6. The outlet opening of the exhaust solenoid valve 6 is connected to the exhaust duct 7.

A connection duct 8 and at least one operating cylinder 9 are also part of the system. The connection duct 8 is connected to the connection opening 5c of the three-way union 5 and to the operating cylinder 9. The pressurized fluid coming from the source 2 may be conducted via the connection duct 8 into the body 9b of the operating cylinder 9, thereby actuating the stem 9a of the operating cylinder 9 and causing it to come out of the body 9b of the operating cylinder 9. Coming out of the body 9b of the operating cylinder 9 the stem 9a strikes against the bar 1. As will be explained below, in order for the bar 1 to undergo the resonance phenomenon, these impacts against the bar 1 occur with a frequency that is equal to the natural frequency of the bar 1.

As shown in the figures, the operating cylinder 9 is positioned in such a way that the point in which the bar 1 is struck by the stem 9a is as close as possible to the fixed end of the bar 1, i.e. in the vicinity thereof. In general, the stem 9a could strike the bar 1 at any point, however, the more is this point close to the fixed end of the bar 1, the less is energy required to make the stem 9a strike the bar 1, since the more this point is close to the fixed end of the bar 1, the less is the movement the stem 9a has to make to strike the bar 1. This is due to the fact that moving away from the fixed end of the bar 1, the amplitude of the oscillations performed by the points of the bar 1 progressively increase, because this value varies between the zero value of the fixed end of the bar 1 and the maximum value of the free end of the bar 1.

The system also comprises a command and control board 10, by means of which all system components and related operating states are managed.

It would be natural to think that the pressurized fluid is compressed air and that the operating cylinder 9 is a pneumatic operating cylinder. This solution is certainly suitable for many situations, however, since compressed air is not readily available in large quantities, it is preferable for the operating cylinder 9 to be a hydraulic operating cylinder and the pressurized fluid to be a pressurized liquid, in particular pressurized water, such as running water coming from any existing feeding pipe of the waterworks, of a factory or of a home, which would thus act as source 2.

During the operation of the system, the inlet solenoid valve 4 and the exhaust solenoid valve 6 are continuously switched from a first operating state thereof, wherein the inlet solenoid valve 4 is open and the exhaust solenoid valve 6 is instead at the same time closed, to a second operating state thereof, wherein the inlet solenoid valve 4 is closed and the exhaust solenoid valve 6 is instead at the same time open, and vice versa from said second operating state to said first operating state.

In the first operating state described above, the pressurized fluid coming from the source 2 can flow to the operating cylinder 9 and actuate the stem 9a thereof, causing it to come out of the body 9b of the operating cylinder 9. This fact causes the bump of the stem 9a against the bar 1. In the second operating state described above, instead, the operating cylinder 9 is directly connected to the exhaust duct 7, so that a drop in the pressure value of the pressurized fluid occurs, which falls to the value of atmospheric pressure. As a result, at the same time, a small quantity of fluid, proportional to the value of the pressure drop, flows into the exhaust duct 7. Consequently, the stem 9a no longer bumps against the bar 1.

The continuous alternation between the two aforementioned states, i.e., the passage from the first state to the second, then from the second to the first, and then again from the first to the second, and so on, causes that the bar 1 is struck by the stem 9*a* with periodic frequency.

Assuming therefore that the natural frequency of the bar 1 fixed at one end is n, if, as is foreseen by the invention, the inlet solenoid valve 4 and the exhaust solenoid valve 6 are continuously switched with a frequency precisely equal to the natural frequency n of the bar, then the inlet solenoid valve 4 and the exhaust solenoid valve 6 are for n times per second in said first operating state, in which a stroke is inflicted by means of the stem 9*a* to the bar 1. As a result of this, the bar 1 which is struck n times per second by the stem 9*a* is subjected to a stress which causes resonance and the amplitude of the oscillations of the bar 1 will tend to increase.

The system further comprises transformation and transmission means 11*a*,11*a*' and drive means 11*b*;11*b*'.

The transformation and transmission means 11*a*,11*a*' transform the oscillation movement performed by the bar 1 into a back-and-forth translation movement and then transmit said back-and-forth translation movement to the drive means 111*b*;11*b*'. As can be seen in the figures, the transformation and transmission means comprise a first rod 11*a*, which is connected at a first end thereof to the bar 1, and a second rod 11*a*', which is connected at a first end thereof in an articulated manner, in particular by a ball-joint, to the second end of the first rod 11*a*. The ball-joint connecting the two rods 11*a*,11*a*' serves to take into account the fact that, as a result of the oscillations, the free end of the bar 1 also performs displacements which are parallel to the longitudinal direction of the bar 1.

The drive means 11*b*;11*b*' are connected, specifically in an articulated manner, to the second end of the second rod 11*a*' to receive from it 11*a*' said back-and-forth translation movement and to execute thereby a cyclic drive movement. In the case of the drive means 11*b*, see FIGS. 1-4, a hinged connection may be sufficient, whereas in the case of the drive means 11*b*' an articulated connection is preferred, see FIGS. 5-9. This ensures optimal offsetting of the above-mentioned displacements that the free end of the bar 1 makes parallel to its longitudinal direction.

A device for generating electrical energy 11*c*;22 is also part of the system. Such device 11*c*;22 performs two tasks. The first task is to counteract the increase in amplitude of the oscillations due to the resonance, in order to keep the value of the amplitude within tolerable values, which is equivalent to extracting energy, in particular motion energy, from the oscillating structure formed by the bar 1. In other words, the device for generating electrical energy 11*c*;22 also acts as a device for limiting the amplitude of the oscillations of the bar 1. The second task of the device for generating electrical energy 11*c*;22 is to exploit the motion energy it has extracted from the oscillating structure consisting of the bar 1 to generate electrical energy. The device for generating electrical energy 11*c*;22 is connected for this purpose to the drive means 11*b*;11*b*', so as to be driven by the cyclic drive movement which the latter 11*b*;11*b*' perform and, in a first embodiment, to which FIGS. 1-4 refer, it comprises an alternator 11*c*, while in a second embodiment, to which FIGS. 5-10 refer, it comprises a linear generator 22.

In the case of the first embodiment, the drive means 11*b* consist of a drive shaft connected to the alternator of the rotor 11*c* and the cyclic drive movement is a rotational movement, represented with a curved arrow in FIGS. 1-4. As a result of this rotational movement, the rotor of the alternator 11*c* rotates inside the stator of the alternator 11*c* and this produces, in a known manner, electrical energy.

In the case of the second embodiment, instead, the drive means 11*b*' consist of the slider of the linear generator 22 and in this case the cyclic drive movement coincides with the above-mentioned back-and-forth translation movement. Although linear generators are well known, it was considered useful to represent their main characteristics in FIGS. 9 and 10 to facilitate the understanding of the present description.

Figure 9:
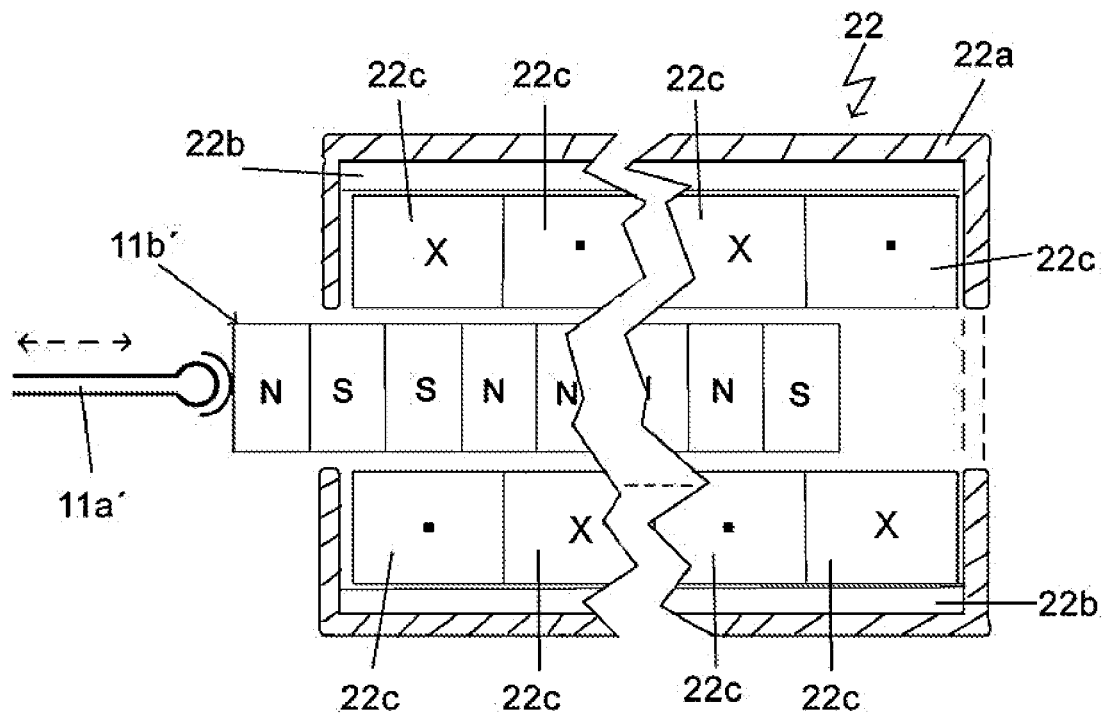
FIGS. 9 and 10 a longitudinal cross-section and a transverse cross-section of the linear generator shown in FIGS. 5-8.
Figure 10:
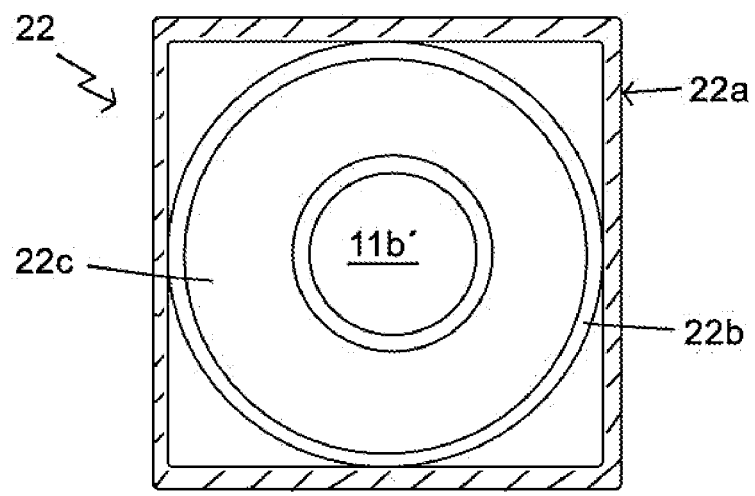

The linear generator 22 comprises a casing 22*a*, which is provided as shown in FIG. 9 with two holes to allow the passage of the slider 11*b*'. As already mentioned, the slider 11*b*', which is formed of a plurality of permanent magnets N (North) and S (South) arranged side by side as shown in FIG. 9, coincides with the drive means 11*b*', so that it is connected by a ball-joint to the second rod 11*a*', see FIGS. 5-10, and performs a back-and-forth movement, i.e. it cyclically enters and exits, as shown by a double arrow in FIG. 9, the tubular metal body 22*b*, around which the windings 22*c* are arranged. The movement of the slider 11*b*' inside the tubular body 22*b* generates, due to known electromagnetic phenomena, an electric current in the windings 22*c* and the directions of the electric current have been indicated using the typical symbols of the technical sector, namely a point and an x.

Lastly, the system also comprises a measuring device 12 for measuring the amplitude and the frequency of the oscillations of the bar 1, so that the oscillation state can be monitored. This measuring device 12 transmits the measurement data to the command and control board 10, so that the resonance phenomenon can be monitored and all necessary control operations can be implemented in a timely manner to keep the resonance active over time.

Figure 2:
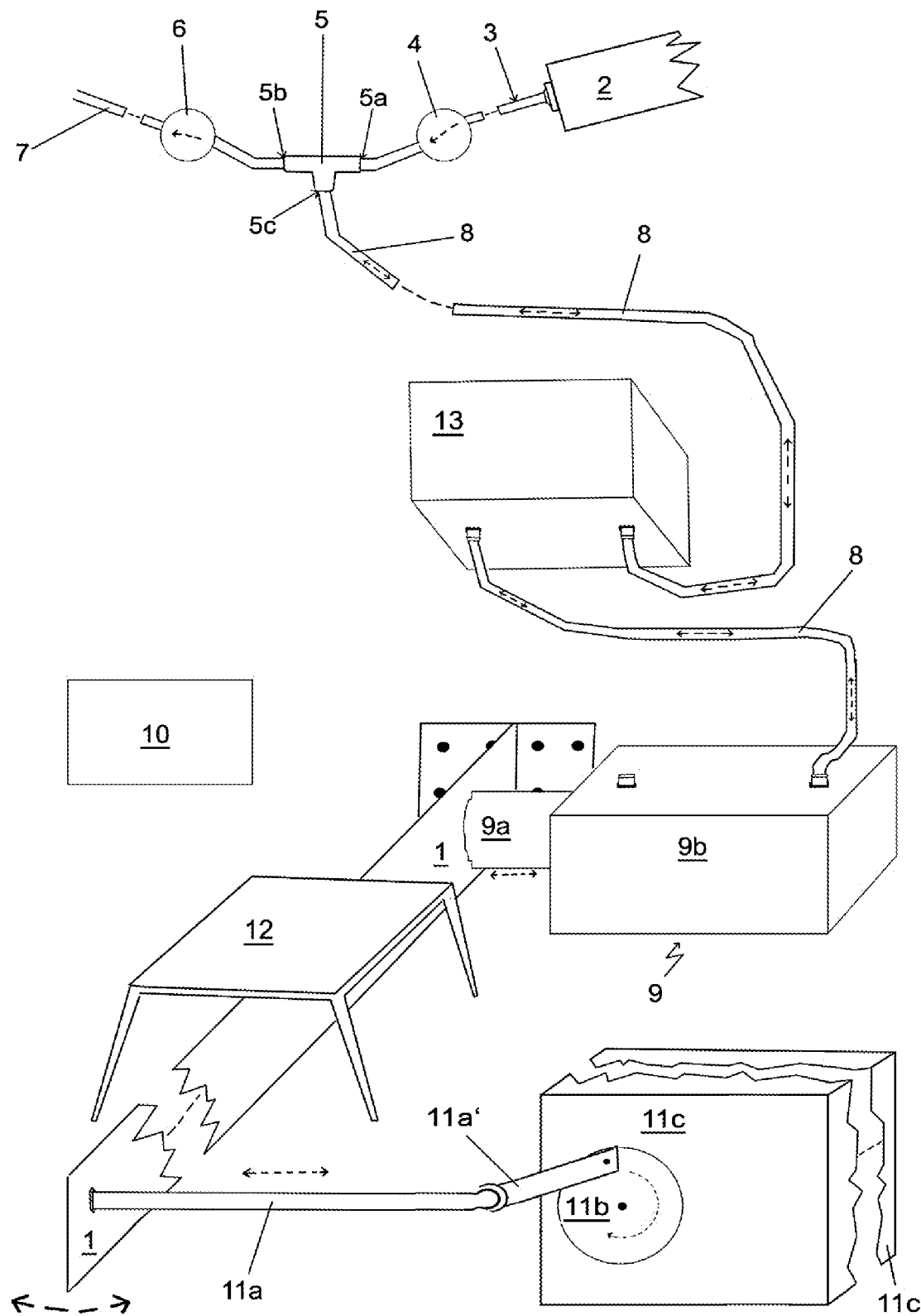
Figure 6:
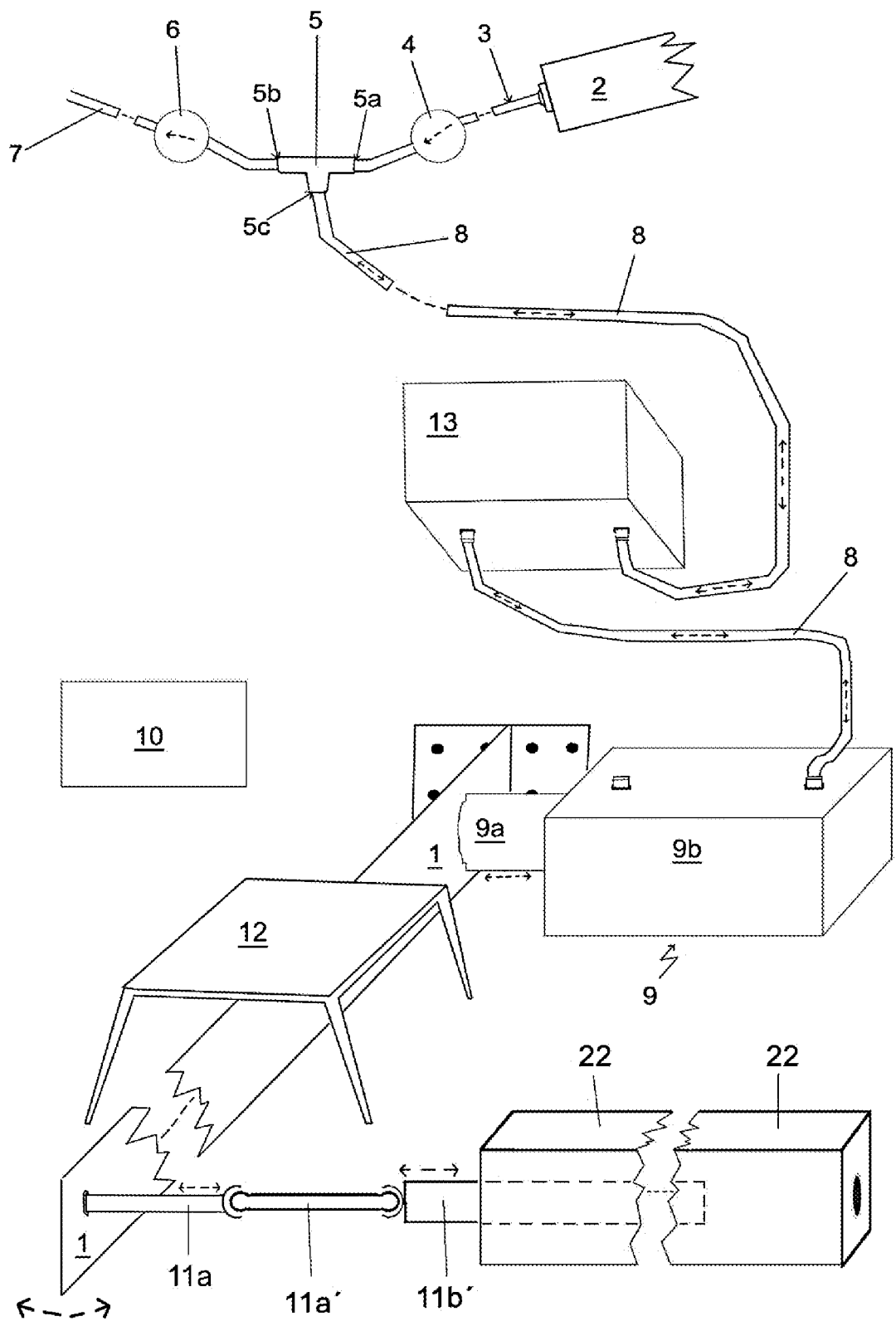

In a second example of the system, shown in FIG. 2 with respect to the first embodiment and in FIG. 6 with respect to the second embodiment, it is foreseen as a further component of the system a pressure amplification device 13 of the pressurized fluid, which is connected in such a way to the connection duct 8 as to be traversed by the pressurized fluid flowing in the connection duct 8. Such pressure amplification device 13 may be useful in particular if the pressurized fluid is a gas, for example compressed air, in which case such a pressure amplification device 13 may be a compressor, or if the source 2 of the pressurized fluid is far away and it is therefore necessary to offset any reduction in the pressure value. Such pressure amplification device 13 is also useful if an increase of the pressure value downstream thereof is desired.

Figure 3:
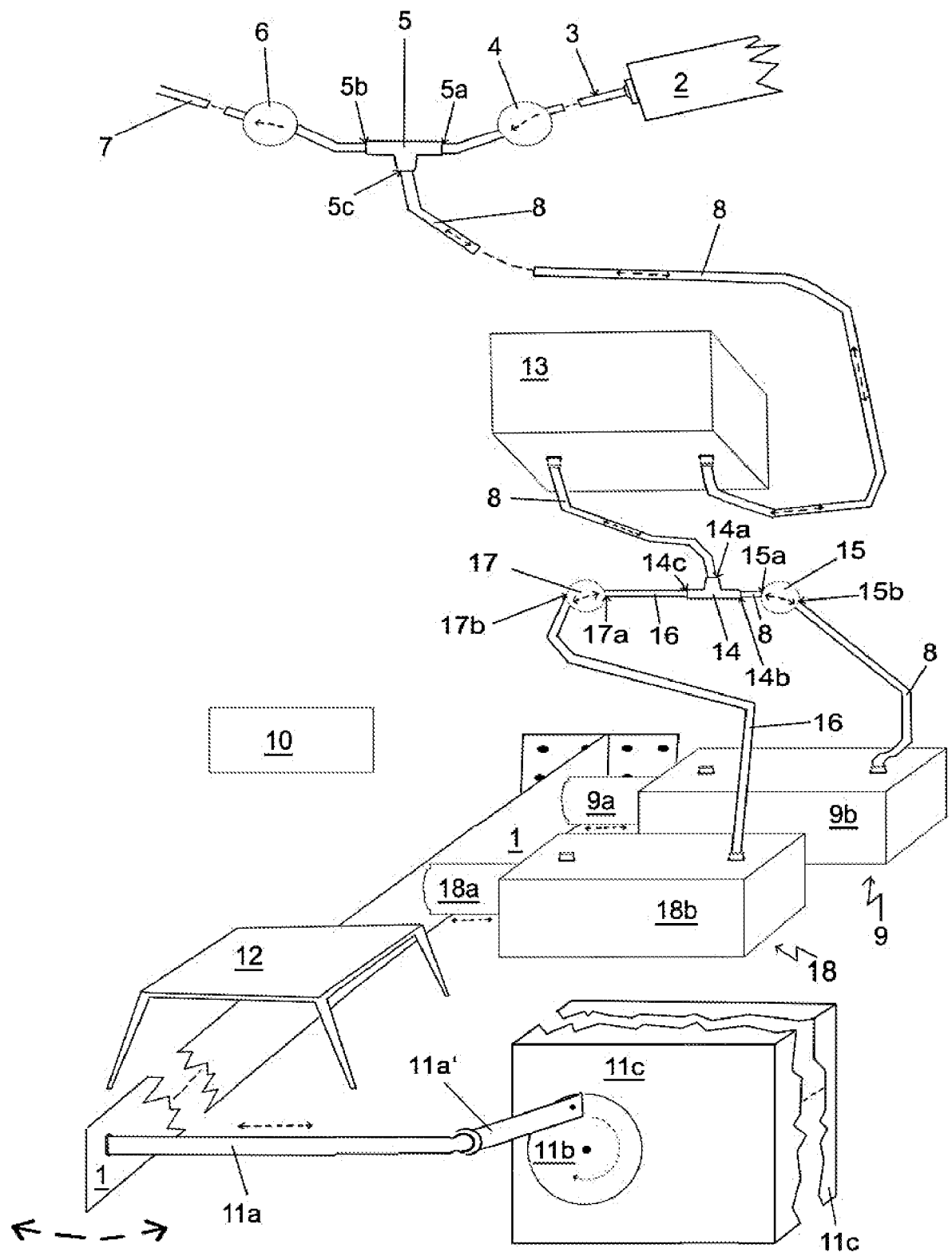
Figure 7:
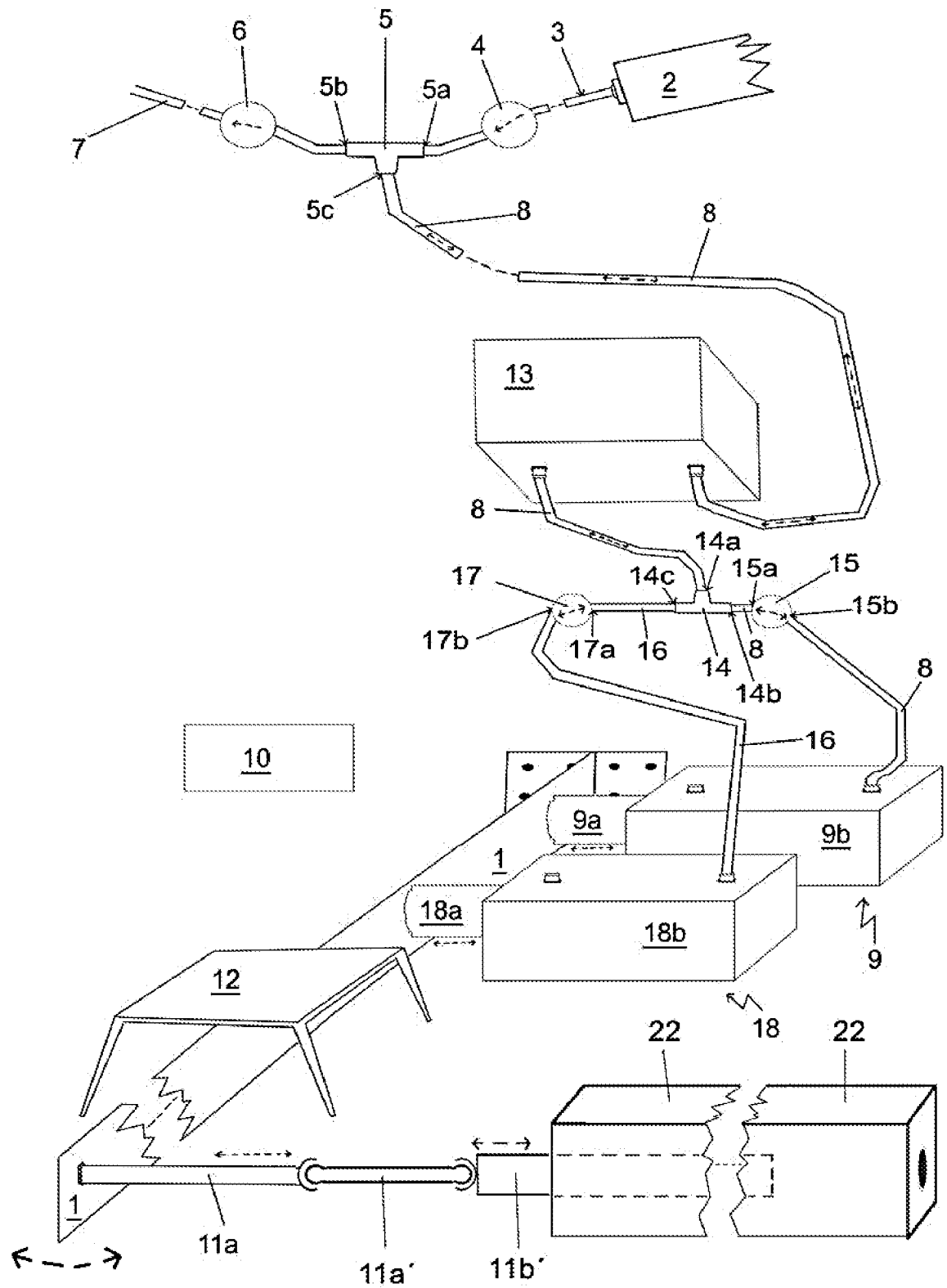
Figure 8:
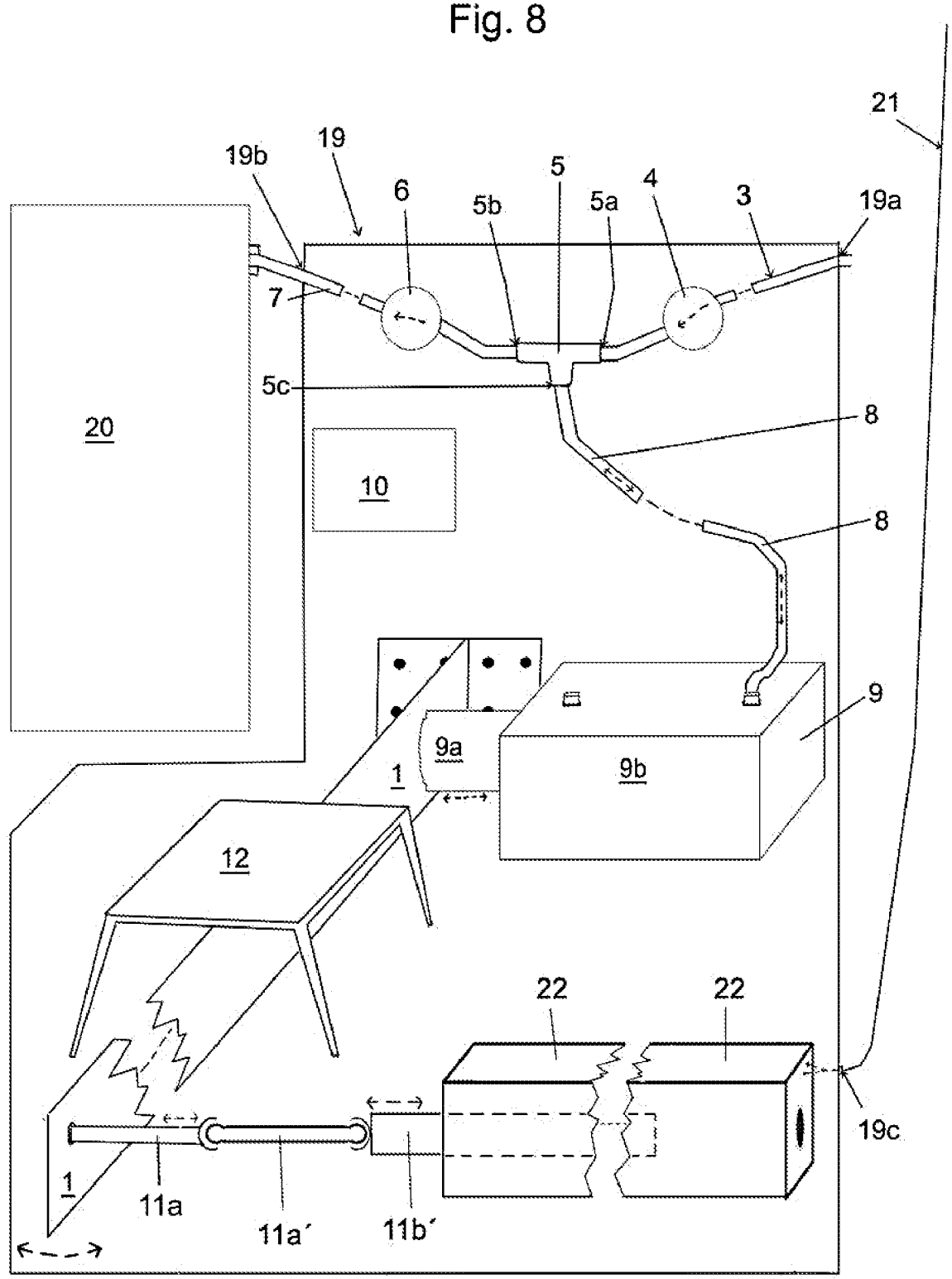

In a third example, to which FIG. 3 refers with respect to the first embodiment and FIG. 7 with respect to the second embodiment, the system also comprises a further three-way union 14, a first 15 and a second shutoff solenoid valve 17, a further connection duct 16 and a further operating cylinder 18.

As can be seen in FIG. 3 respectively FIG. 7, the further three-way union 14 has three connection openings 14*a*,14*b*, 14*c*, two of which 14*a*,14*b* are connected to the connection duct 8. According to FIG. 3, the two passage openings 15*a*,15*b* of the first shutoff solenoid valve 15 are also connected to the connection duct 8, while the two openings 17*a*,17*b* of the second shutoff solenoid valve 17 are connected to the further connection duct 16. In practice, the first shutoff solenoid valve 15 is arranged in the connection duct 8, and the second shutoff solenoid valve 17 is arranged in the further connection duct 16. The latter 16 is also connected at its ends; at one end to the connection opening 14*c* of the three-way union 14 and, at the other end, to the further operating cylinder 18.

The stem 18a of the further operating cylinder 18 bumps against the bar 1 as it comes out of the body 18b of the operating cylinder 18.

The first 15 and the second shutoff solenoid valve 17 can be switched, by means of the command and control board 10, from a first operating state thereof, in which the first shutoff solenoid valve 15 is open and the second shutoff solenoid valve 17 is at the same time closed, to a second operating state thereof, in which the first shutoff solenoid valve 15 is closed and the second shutoff solenoid valve 17 is at the same time open, and vice versa from said second operating state to said first operating state.

The function of the pair of shutoff solenoid valves 15,17 is different from the function of the pair of solenoid valves consisting of the inlet solenoid valve 4 and the exhaust solenoid valve 6. The function of the pair of shutoff solenoid valves 15,17 is to connect, by choice, to the three-way union 5 either the operating cylinder 9 (first operating state of the pair of shutoff solenoid valves 15,17) or alternatively the additional operating cylinder 18 (second operating state of the pair of shutoff solenoid valves 15,17).

The bumps of the stem 18a against the bar 1 also occur, like those of the stem 9a of the operating cylinder 9, with a frequency that is equal to the natural frequency of the bar 1, since the periodicity of these strokes is also controlled by the pair of solenoid valves consisting of the inlet solenoid valve 4 and the exhaust solenoid valve 6.

In fact, the pair of shutoff solenoid valves 15,17 has the sole task of creating, optionally, the two alternative paths that join the three-way union 5 to the operating cylinder 9 or to the further operating cylinder 18.

The further operating cylinder 18 is positioned in such a way that the distance from the fixed end of the bar 1 of the point in which the bar 1 is struck by the stem 18a is greater than the corresponding distance of the point in which the bar 1 is struck by the stem 9a of the operating cylinder 9. As explained above, the greater distance results in a greater excursion of the outward movement of the stem 18a, but this greater excursion allows resonance to be achieved in less time.

By switching the pair of shutoff solenoid valves 15,17 to their second operating state, the pressurized fluid from the source 2 flows to the operating cylinder 18 and the further operating cylinder 18 can therefore be used to start the process so that the bar 1 begins to oscillate. Subsequently, when the oscillations are of a desired amplitude, the further operating cylinder 18 is stopped, switching the pair of shutoff solenoid valves 15,17 from their second operating state to their first operating state, and the operating cylinder 9 is put into operation in place of the further operating cylinder 18. Since the excursion of the striking movement of the stem 9a of the operating cylinder 9 is smaller than that of the stem 18a of the further operating cylinder 18, resonance can be achieved and maintained with less energy consumption.

Figure 4:
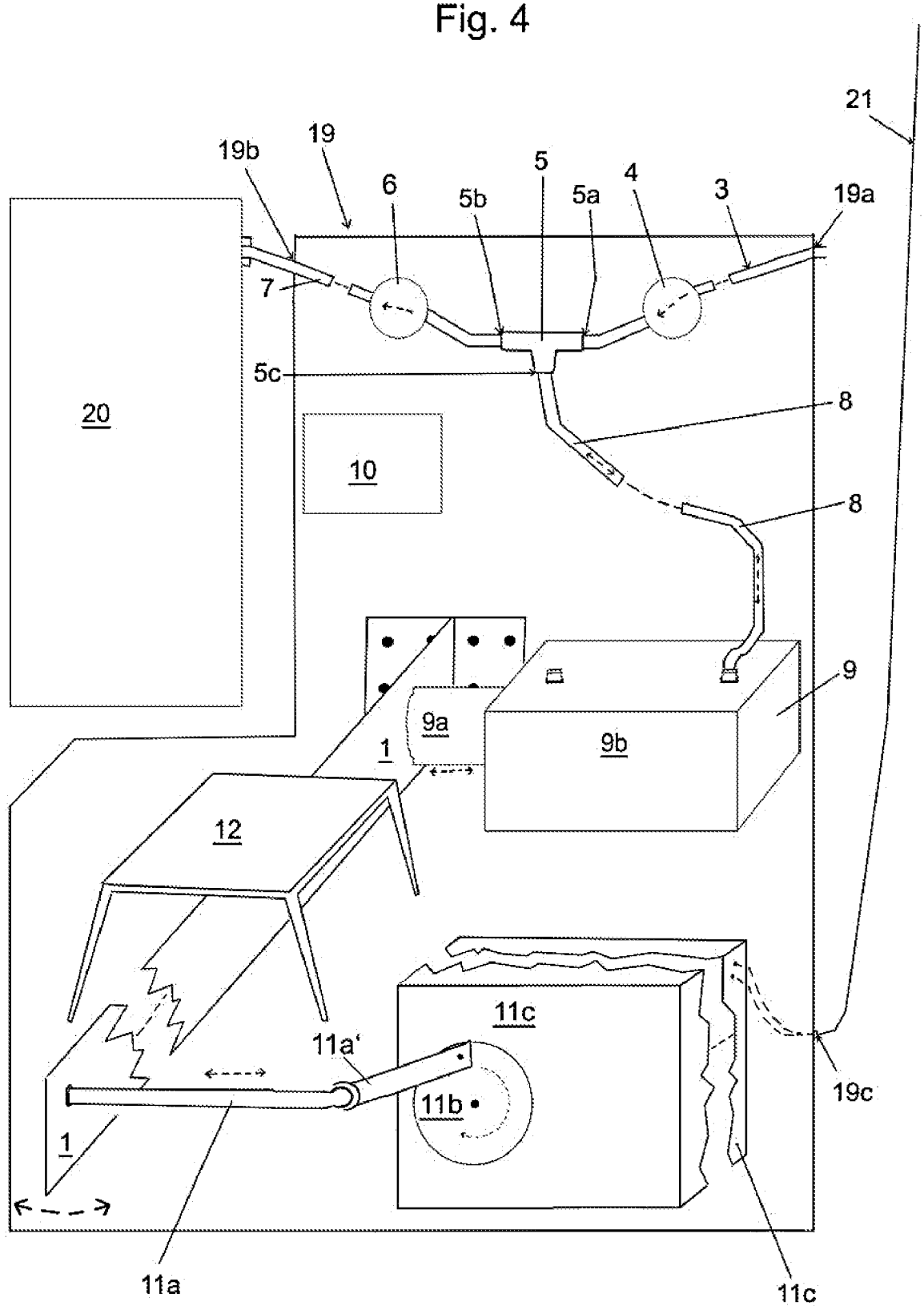
Figure 5:
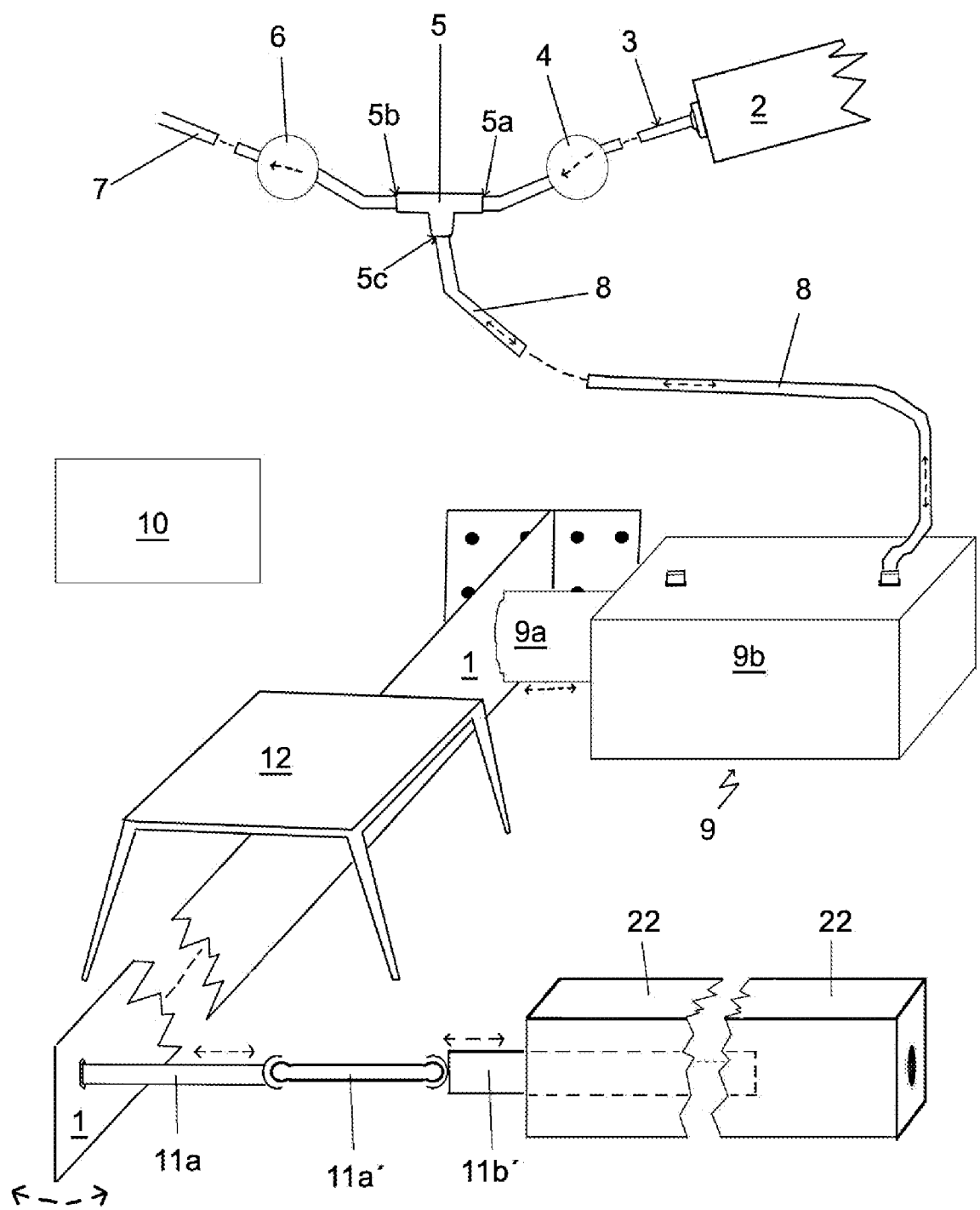
FIGS. 5-8 an overall, three-dimensional representation of, respectively, four examples of a second embodiment of the system, in which the device for generating electrical energy consists of a linear generator, the single components of the system, however, not having been represented all in the same scale, for a clearer understanding thereof.

With reference to the first respectively to the second embodiment, FIG. 4 respectively 8 refers lastly to a fourth example of the system, in the case of which the system also comprises a watertight receptacle 19, a tank 20 and an electrical cable 21.

The watertight receptacle 19 is suitable to withstand external pressures higher than atmospheric pressure and is provided with an inlet opening 19a, through which the feeding duct 3 extends, and with an exhaust opening, through which the exhaust duct 7 extends. With reference to the tank 20, it is connected to the exhaust duct 7, while the electrical cable 21 is connected to the alternator 11c respectively to the linear generator 22.

The receptacle 19 has a passage opening 19c through which the electrical cable 21 extends, by means of which 21 the electrical energy produced by the alternator 11c, respectively by the linear generator 22, is transmitted.

It is also foreseen that all the components of the system, with the exception of the feeding duct 3, the exhaust duct 7, the tank 20 and the electrical cable 21, are arranged entirely inside the receptacle 19. Thus, the system according to FIG. 4 respectively 8 is suitable for being immersed in water, for example in a lake or in the sea, so that the lake or the sea acts as a source 2 of the pressurized fluid and it is the pressurized water of the same that flows through the feeding duct 3.

The invention claimed is:

1. A system for generating electrical energy, comprising:
a bar (1) fixed at a fixed end (1) thereof;
a source (2) of a pressurized fluid;
a feeding duct (3) connected to the source (2) of the pressurized fluid;
an inlet solenoid valve (4) having an inlet opening connected to the feeding duct (3);
a three-way union (5), having
an inlet opening (5a) connected to an outlet opening of the inlet solenoid valve (4),
an exhaust opening (5b), and
a connection opening (5c);
an exhaust solenoid valve (6) having an inlet opening connected to the exhaust opening (5b) of the three-way union (5);
an exhaust duct (7) connected to an outlet opening of the exhaust solenoid valve (6);
a connection duct (8) connected to the connection opening (5c) of the three-way union (5);
at least one operating cylinder (9) connected to the connection duct (8), a stem (9a) of the operating cylinder (9) bumping against the bar (1) upon its exit from a body (9b) of the operating cylinder (9);
a command and control board (10);
a first rod (11a), which is connected with its first end to the bar (1), and a second rod (11a'), which is connected with its first end in an articulated manner to a second end of the first rod (11a), the first rod (11a) and the second rod (11a) jointly acting as transformation and transmission means, which transforms an oscillation movement of the bar (1) into a back-and-forth translation movement and then transmits the back-and-forth translation movement;
drive means (11b;11b'), which are connected in an articulated manner to a second end of the second rod (11a'), to receive the back-and-forth translation movement and cause a cyclic drive movement of the drive means (11b;11b'); and
a device for generating electrical energy (11c;22), which is connected to the drive means (11b;11b') so as to be driven by the cyclic drive movement of the drive means (11b;11b'),
wherein during operation of the system the inlet solenoid valve (4) and the exhaust solenoid valve (6) are continuously switched with a frequency equal to a natural frequency of the bar (1) from
a first operating state thereof, wherein the inlet solenoid valve (4) is open and the exhaust solenoid valve (6) is closed, to
a second operating state thereof, wherein the inlet solenoid valve (4) is closed and the exhaust solenoid valve (6) is open, and vice versa from the second operating state to the first operating state.

2. The system according to claim 1,
wherein the operating cylinder (9) is positioned in such a way that a point where the bar (1) is bumped by the stem (9a) is proximal to the fixed end of the bar (1).

3. The system according to claim 2,
wherein the operating cylinder (9) is a hydraulic operating cylinder and
wherein the pressurized fluid is a pressurized liquid.

4. The system according to claim 3,
wherein the pressurized liquid is pressurized water and
wherein the source (2) of the pressurized water is a pipe of running water.

5. The system according to claim 1,
further comprising a measuring device (12) for measuring an amplitude and a frequency of the oscillation movement of the bar (1), the measuring device (12) being connected to the command and control board (10) and configured to transmit measurement data to the command and control board (10).

6. The system according to claim 1,
further comprising a pressure amplification device (13) of the pressurized fluid, which (13) is connected to the connection duct (8) in such a way that it is crossed by the pressurized fluid flowing in it (8).

7. The system according to claim 1, further comprising:
a further three-way union (14), two (14a,14b) of its three connection openings (14a,14b,14c) being connected to the connection duct (8);
a first shutoff solenoid valve (15), whose two passage openings (15a,15b) are connected to the connection duct (8);
a further connection duct (16), which is connected to the remaining one (14c) of the connection openings (14a, 14b,14c) of the further three-way union (14);
a second shutoff solenoid valve (17), whose two passage openings (17a,17b) are connected to the further connection duct (16); and
a further operating cylinder (18) connected to the further connection duct (16), a stem (18a) of the further operating cylinder (18) bumping, upon its exit from a body (18b) of the further operating cylinder (18), with a frequency equal to the natural frequency of the bar (1) against the bar (1),
the first (15) and the second shutoff solenoid valve (17) being able to be switched from
a first operating state thereof, in which the first shutoff solenoid valve (15) is open and the second shutoff solenoid valve (17) is closed, into
a second operating state thereof, in which the first shutoff solenoid valve (15) is closed and the second shutoff solenoid valve (17) is open, and
vice versa from the second operating state thereof into the first operating state thereof.

8. The system according to claim 7,
wherein the further operating cylinder (18) is positioned in such a way that a distance from the fixed end of the bar (1) of a point in which the bar (1) is bumped by the stem (18a) of the further operating cylinder (18) is greater than a distance of a point in which the bar (1) is bumped by the stem (9a) of the operating cylinder (9).

9. The system according to claim 1, further comprising:
a watertight receptacle (19), suitable to withstand external pressures higher than atmospheric pressure and provided with an inlet opening (19a), through which the feeding duct (3) extends, and with an exhaust opening (19b), through which the exhaust duct (7) extends;
a tank (20) connected to the exhaust duct (7); and
an electrical cable (21), which is connected to the device for generating electrical energy (11c,22) and by means of which (21) the electrical energy produced by the device for generating electrical energy (11c,22) is transmitted, the receptacle (19) having a passage opening (19c), through which extends the electrical cable (21), and all the components of the system, except for the feeding duct (3), the exhaust duct (7), the tank (20) and the electrical cable (21) being arranged fully inside the receptacle (19).

10. The system according to claim 9,
wherein the device for generating electrical energy is an alternator (11c), and
wherein the drive means (11b) consist of a drive shaft connected to a rotor of the alternator (11c), the cyclic drive movement being a rotational movement.

11. The system according to claim 9,
wherein the device for generating electrical energy is a linear generator (22), and
wherein the drive means (11b') consist of a slider of the linear generator (22), the cyclic drive movement coinciding with the back-and-forth translation movement.

* * * * *